US 6,532,430 B1

(12) United States Patent
Kotlow

(10) Patent No.: US 6,532,430 B1
(45) Date of Patent: Mar. 11, 2003

(54) METHOD FOR DETERMINING A TURBINE PUMP RPM PROFILE

(75) Inventor: Dominik A. Kotlow, Wakefield, RI (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 183 days.

(21) Appl. No.: 09/606,117

(22) Filed: Jun. 12, 2000

(51) Int. Cl.[7] ............................................... G01L 25/00
(52) U.S. Cl. ......................... 702/114; 702/86; 702/145; 702/147; 416/30; 416/61; 417/42; 417/63; 415/118
(58) Field of Search .................... 702/86, 114, 145, 702/147; 416/30, 61; 417/63, 42; 415/118

(56) References Cited

U.S. PATENT DOCUMENTS 5,223,207 A * 6/1993 Gross et al. ................ 376/215
5,804,726 A * 9/1998 Geib et al. .................. 702/113
5,825,657 A * 10/1998 Hernandez .................. 702/182

* cited by examiner

Primary Examiner—John Barlow
Assistant Examiner—Stephen J. Cherry
(74) Attorney, Agent, or Firm—James M. Kasischke; Michael F. Oglo; Jean-Paul Nasser

(57) ABSTRACT

A method is provided to determine an rpm profile for a turbine pump from pulse train data obtained from a sensor at the pump. The method eliminates ramp-up spikes from the pulse train by comparing the spike pulse count to the surrounding pulse counts and replacing data points responsible for abnormal pulse count increases/decreases between data points with interpolated values. The method similarly replaces data points that lie outside statistically acceptable pulse rate variations. A rough rpm plot is then generated, which must be smoothed to obtain the final rpm profile. Data points are infused between sensor data points to achieve an acquisition rate of approximately 1000 points per second. The infusion is accomplished by interpolating between sensor data points and equally spacing the infused data points along the interpolated curve. A smoothing function is then applied to the infused data set.

8 Claims, 1 Drawing Sheet

METHOD FOR DETERMINING A TURBINE PUMP RPM PROFILE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to underwater projectile launch systems, and more particularly to a method for determining an rpm profile for a turbine pump based on a pulse train obtained during a pump test.

(2) Description of the Prior Art

Turbine pumps are typically used to launch a projectile, such as a torpedo, from a submerged tube. In order to test for the proper operation of the pump, measurements of the pump's rpm are taken during a test firing and compared to performance specifications. The rpm measurements are derived from a pulse train obtained by a Hall effect sensor or optical encoder mounted to the pump. The specific sensor used will depend on the type of pump being tested. As the turbine rotates, the sensor provides one or more pulses for each rotation of the turbine. The timing of the pulses, or pulse train provides the rpm indication. For example, a sensor providing four pulses per revolution, with a pulse rate of 16 pulses per second indicates an rpm of 240, i.e., $$\left(16\frac{pulses}{second} \bigg/ 4\frac{pulses}{revolution}\right) * 60\frac{seconds}{minutes} = 240\frac{revolutions}{minutes}.$$

Currently, a frequency-to-voltage converter is used to convert pulse data to rpm data due to the time varying nature of the pulse frequency. Appropriate conversion factors are applied depending on the turbine pump type and sensor configuration. However, to ensure consistent and comparable results, the converter must be calibrated for each pump test. Additionally, it has been found that data acquisition systems used to obtain the pulse train should be a counter-timer that reads the pulses every 30 milliseconds in order to capture both low frequency pulses at the beginning of rotation and high frequency pulses when the pump rotates at maximum speed. This timing results in a relatively rough frequency verses time curve. Further, spikes tend to occur at the onset of ramp-up, i.e., when the pump first begins rotation and rpm's are increasing. Such spikes cause improper interpolation of the rpm data when included in the pulse data set. Thus any one or all of these factors may result in an erroneous performance evaluation of the turbine pump.

SUMMARY OF THE INVENTION

Accordingly, it is an object of the present invention to provide a method to determine a turbine pump rpm profile, which does not require equipment calibration for each test.

Another object of the present invention is to provide a method to determine a turbine pump rpm profile, which effectively eliminates spikes in the pulse train.

A further object of the present invention is to provide a method to determine a turbine pump rpm profile having a smooth frequency verses time curve.

A still further object of the present invention is to provide a method to determine a turbine pump rpm profile, which is highly repeatable, with a high accuracy level.

Other objects and advantages of the present invention will become more obvious hereinafter in the specification and drawings.

In accordance with the present invention, a method is provided to determine an rpm profile for a turbine pump based on a pulse train obtained during a pump test. The method obtains a pulse count over a fixed time period, preferably every 30 milliseconds, from a computer controlled data acquisition system reading the pulse data from a sensor at the pump. The 30-millisecond acquisition rate has been found to achieve an accurate rpm profile throughout the operating range of the pump, i.e., 0–1200 rpm. Once the pulse train data has been obtained, the method eliminates ramp-up spikes using a spike elimination technique, which incorporates previous test data. The method first compares the spike pulse count to the surrounding pulse counts and rejects data points responsible for abnormal (in relation to the previous data) pulse count increases between data points. The method further rejects data points that lie outside statistically acceptable pulse rate variations.

Once ramp-up spikes have been eliminated, a frequency, or rpm curve can be generated. Depending on the pump being tested, the sensor may be a Hall effect sensor or an optical encoder and the number of rotations per pulse may also vary. The method applies standard factors to the pulse train appropriate to the pump being tested in order to convert the pulse train to a rough rpm verses time curve. The rough curve is then smoothed by first infusing data points to achieve an acquisition rate of approximately 1000 points per second. The infusion is accomplished by interpolating between actual data points and equally spacing the infused data points along the interpolated curve. Preferable, a three-point interpolation scheme is used. Such a large number of data points is necessary to then apply one of many standards, $5^{th}$ order, smoothing processes to the rough curve resulting in the final rpm curve.

Thus, the present invention provides a method to determine an rpm curve, or profile of a turbine pump system. The method uses the pulse train directly from the counter-timer of a data acquisition system in determining the profile. The method does not use a frequency-to-voltage converter and therefore calibration is not required for each test. Ramp-up spikes are eliminated from the data, in a manner which yields repeatable profiles. A rough curve is generated to which data points are infused, such that a smoothing process can be applied to the curve. The resultant rpm profiles based on this method have been found to have a 98% level of accuracy and be repeatable to within 2%.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing, labeled as FIG. 1 and showing a flow chart representation of the method of the present invention.

DESCRIPTION OF THE PREFERRED EMBODIMENT

Figure 1:
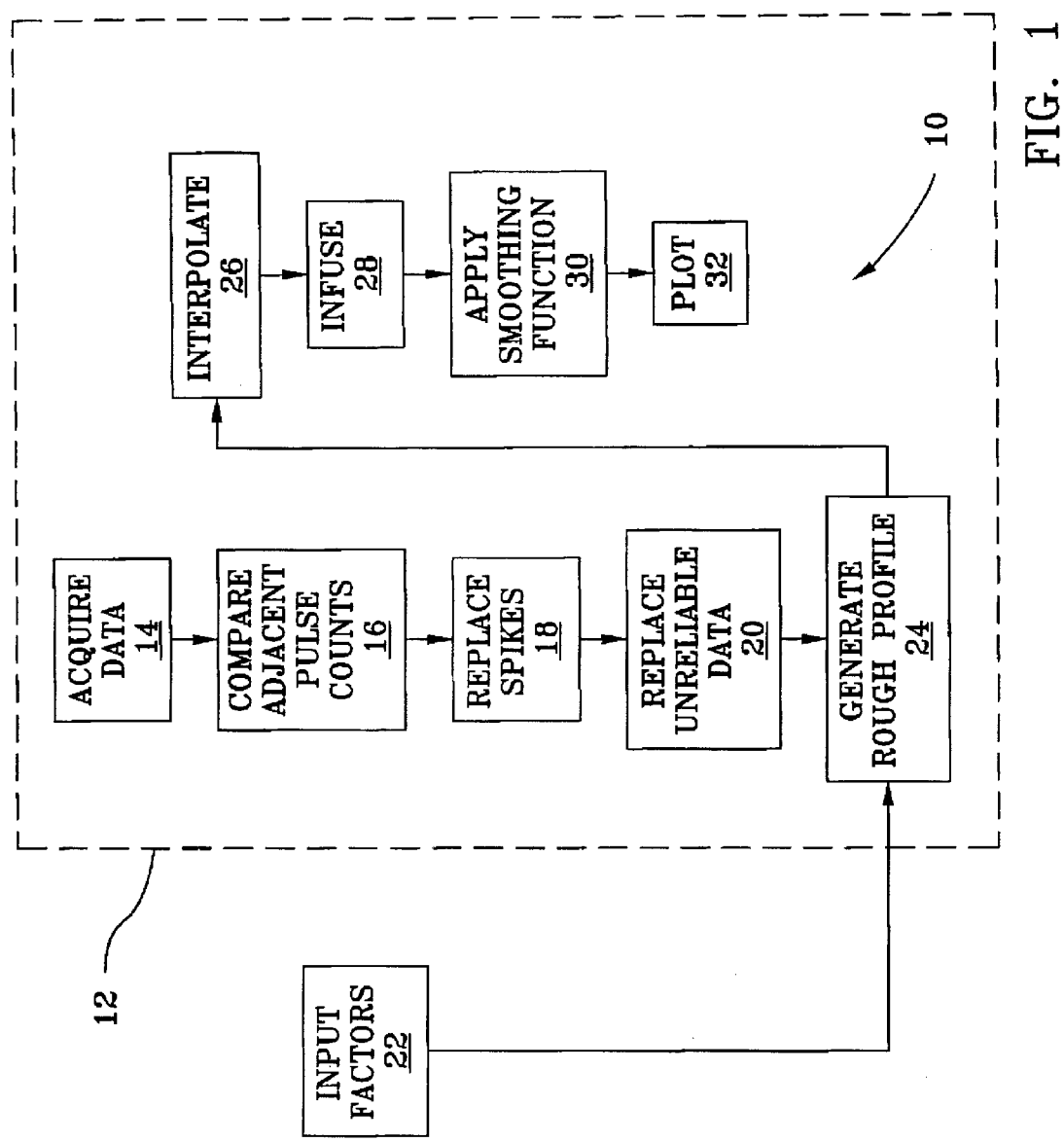

Referring now to FIG. 1, there is shown a flow chart representation of method 10 used to obtain a turbine pump performance profile in terms of a plot of revolutions per minute (rpm) over time. Method 10 is implemented on a computer 12, such as a computer used for controlling standard data acquisition systems and having counter-timer to obtain data. In the preferred embodiment, the data being acquired at 14 consists of a pulse count over a fixed time period of 30 milliseconds. Each pulse corresponds to a fixed degree of rotation of the turbine, such that the number of pulses over a fixed period of time equals a certain rotation per time period, which corresponds to the rpm for that time period. The pulses may be obtained from any number of well-known sensors, such as Hall effect sensors, electro-optic sensors, or encoders.

It is known in the turbine pump field that pulse counts obtained by a counter-timer typically exhibit spikes during the ramp-up period, i.e., as the turbine accelerates. To eliminate the spikes, each pulse count is compared (at 16) to its adjacent pulse counts. Using historical test data as a basis, pulse count data points that show spike-like qualities, i.e., a sharp increase/decrease in neighboring pulse counts, are replaced with a count value interpolated between adjacent data points at 18. Similarly, step 20 replaces pulse count data points that lie outside statistically acceptable pulse rate variations and those that exceed the physical capabilities of the turbine pump, as determined from the historical test data and mechanical properties of the pump. Such data points have been found to be unreliable and tend to skew the resultant rpm profile.

By inputting (at 22) the proper conversion factors for the sensor type and pump type, a rough rpm verses time curve, or profile is generated at 24. The pulse count data points obtained by the sensors may not result in a smooth curve due to sensor sensitivity to noise and vibration during pump operation, or spacing and sensor inaccuracies. Normally, a smoothing function would be applied to the rough rpm curve to obtain a final rpm profile. However, typical smoothing functions require a large number of data points. Thus, artificial data points are infused by interpolating (at 26) between pulse count data points to obtain interpolated segments and equally spacing (at 28) artificial data points on each of the segments between pulse count data points to obtain approximately 1000 data points per second. For the 30 millisecond pulse count data acquisition rate of the preferred embodiment, approximately 30 artificial data points are infused between each pulse count data point. Interpolation may be by any one of many standard schemes. In the preferred embodiment, a three-point interpolation is used to provide a curved segment between the pulse rate data points, while trying to minimize the computational burden. A smoothing function, preferably a $5^{th}$ order function, is applied (at 30) to the infused data set to obtain the final rpm profile, which is plotted (at 32) for turbine pump performance evaluations.

The invention thus described provides a method that uses pulse count data directly to obtain an rpm profile of a turbine pump, without the need for a frequency-to-voltage converter as in the prior art systems and methods. Thus, the need for converter calibration for each test is eliminated allowing for additional tests within a given time frame and also reducing costs on a per test basis. The method further provides highly repeatable results in that ramp-up spikes are effectively eliminated from contributing to the rpm profile and smoothing techniques can be applied to the data.

Although the present invention has been described relative to a specific embodiment thereof, it is not so limited. While the method has been described for determining a turbine pump rpm profile, the spike elimination and infusion techniques can be applied to many data sets where the nature of the sensing instruments results in aberrant spikes and a sparse data set. Also, as previously noted, the interpolation and smoothing functions used may be chosen from among many well-known functions so as to fit the data set.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method implemented on a computer for determining a readout plot of rpm verses time of a turbine pump based on a pulse train obtained during earlier testing of said turbine pump to provide a performance evaluation of said turbine pump comprising the steps of:

acquiring pulse count data and spikes from a sensor mounted to a turbine pump, said pulse count data corresponding to rotation of said turbine pump and said spikes being created during acceleration of said pump turbine;

comparing said pulse count data and said spikes to adjacent pulse counts using a pulse train as a basis, said pulse train being obtained during earlier testing of said turbine pump and corresponding to rpm verses time;

replacing said spikes with interpolated pulse count values, said interpolated pulse count values being based on said pulse train;

replacing unreliable pulse count values lying outside of statistically acceptable pulse count variations and those exceeding physical capabilities of said turbine pump with reliable pulse count values based on said pulse train;

inputting conversion factors representative of said turbine pump; and generating signals from said interpolated pulse count values, said reliable pulse count values, and said conversion factors, said generated signals being representative of a rough plot of rpm verses time for said turbine pump for performance evaluation of said turbine pump.

2. The method of claim 1 further comprising the steps of:

interpolating artificial data between said pulse count data in interpolated segments;

infusing said artificial data between said pulse count data to equally space the infused data in said interpolated segments;

applying a smoothing function to said pulse count data, said interpolated pulse count values, said reliable pulse count values and said infused data; and plotting said smoothed pulse count data, interpolated pulse count values, reliable pulse count values and infused data to obtain a smooth plot of rpm verses time for said turbine pump for performance evaluation of said turbine pump.

3. The method of claim 2 wherein said artificial data are infused between adjacent ones of said data pulses to obtain approximately 1000 data points per second.

4. The method of claim 3 wherein said data pulses are acquired at a 30 millisecond acquisition rate.

5. The method of claim 2, wherein the interpolated segments are determined based on a three-point interpolation.

6. The method of claim 2, wherein the smoothing function is a $5^{th}$ order smoothing technique.

7. The method of claim 4 wherein said turbine pump has an operating range of 0–1200 rpm.

8. The method of claim 7 wherein said sensor of the step of acquiring is selected from one of the group of sensors of rotational displacement comprised of Hall effect sensors, electro-optic sensors, and encoders.

* * * * *